United States Patent Office 3,634,340
Patented Jan. 11, 1972

3,634,340
PROCES FOR THE PRODUCTION OF POLYMERIC OLEFINE OXIDES HAVING HIGH MOLECULAR WEIGHTS
Peter Günther, Opladen, and Wolfgang Oberkirch, Mariaweiler, Germany, assignors to Farbenfabriken Bayer Aktiengesellschaft, Leverkusen, Germany
No Drawing. Filed Aug. 29, 1969, Ser. No. 854,276
Claims priority, application Germany, Oct. 23, 1968,
P 18 04 528.8
Int. Cl. C08g 23/14
U.S. Cl. 260—2                                 2 Claims

ABSTRACT OF THE DISCLOSURE

Process for polymerizing olefine oxides with a catalyst prepared by reducing a mixture of a transition metal salt or enolate and a phosphorus acid amide with a metal alkyl compound.

---

This invention relates to a process for polymerising olefine oxides with mixed catalysts consisting of a transition metal compound and a metal alkyl compound, said mixed catalysts contain an addition of an acid amide.

It is known to polymerise olefine oxides with a mixed catalyst which consists of the combination of a transition metal and an alkyl compound of a metal of the second or third group of the Periodic Table (see S. Kambara and A. Takahashi, Makromol. Chem. 58, 226 (1962)).

It has now been found that polymers of considerably higher molecular weight are obtained, sometimes with a considerable improvement in yield, if a two-component catalyst of the aforementioned type has an acid amide added thereto as a third component. Using the new three-component catalysts, molecular weights higher by the factors 2 to 15 are usually obtained than is the case with the prior known two-component catalysts. This effect is completely surprising and cannot be explained on the basis of existing knowledge.

According to the new process, the acid amide is added to a catalyst system which is known per se. By way of example, the compound of a transition metal can be dissolved or suspended in an inert solvent. The acid amide is then added and reduction thereafter takes place with a metal alkyl compound. After the reduction has taken place, the olefine oxide is added and the polymerisation is allowed to proceed.

Suitable transition metal compounds are salts of inorganic or organic acids and also chelates of metals of the IV to VIII secondary group of the Periodic System, such as halides, nitrates, acetates and β-ketoenolates of titanium, zirconium, vanadium, chromium, manganese, cobalt and nickel.

The following are to be considered as solvents: aliphatic and aromatic hydrocarbons, such as hexane, heptane, cyclohexane, benzene, toluene; halogenated hydrocarbons such as chlorobenzene; and ethers such as diethyl ether or tetrahydrofuran.

Suitable metal alkyl compounds are those of the second and third group of the Periodic Table, such as alkyl magnesium halides, dialkyl-zinc and trialkyl aluminum as well as alkyl aluminum halide.

All olefine oxides are in principle suitable for the new process, but $C_2$–$C_8$ alkylene oxides, such as ethylene oxide, propylene oxide, butene oxide, epichlorohydrin, epibromohydrin and allylglycidyl ether. $C_5$–$C_{12}$ cycloolefine oxides, such as cyclopentene oxide, cyclohexene oxide and cyclododecene oxide, and also styrene oxide and phenylglycidyl ether are especially to be considered. Preferably ethylene oxide, propylene oxide, epichlorohydrin, epibromohydrin and cyclopentene oxide are used.

Acid amides which are particularly suitable are amides of the phosphorus acids. Alkylated amides of phosphonic and phosphoric acids are preferred, such as methyl-phosphonic acid-bis-dialkyl amide or phosphoric acid-tris-dialkyl amides.

$C_1$–$C_4$ alkyl and $C_5$–$C_6$ cycloalkyl groups are to be considered as alkyl radicals in the amide groups. Particularly good results are achieved with phosphoric acid-tris-dimethyl amide.

The ratio between the individual catalyst components and also the ratio between catalyst and olefine oxide can be varied within wide limits.

The molar ratio between transition metal compound and acid amide can be between 20:1 and 1:50 but is preferably between 5:1 and 1:10. In one particularly suitable embodiment, the following molar ratios exist: acid amide, transition metal compound, metal alkyl, olefine oxide, such as 5:10:25:1000.

The process can be conducted without using pressure or under superatmospheric pressure. The suitable temperature range is from −30° C. to 150° C. These polymers can be worked up in known manner.

EXAMPLE 1

2.1 g. of tris-acetylacetonate-zirconium-IV-chloride are dissolved in 50 ml. of toluene. 1.8 ml. of hexamethylphosphoric acid triamide are added, and the resulting mixture is cooled to −30° C. and reduced with 3.5 ml. of triethyl aluminum. This catalyst mixture is heated for 15 minutes to 100° C. and added to 1350 ml. of toluene. A strong stream of ethylene oxide is introduced for 6½ hours. The polymerisation is then stopped with a mixture of 100 ml. of isopropanol, 2 ml. of water and 1.0 g. of 2.6-di-tert.-butyl-4-methyl phenol. After removing the solvent, the yield is 175 g. of polyethylene oxide.

$$[\eta]=7.44\ \overline{M}_v\approx1.5\cdot10^6$$

The $[\eta]$- value is determined in water at a temperature of 25° C.

EXAMPLE 2

By following the procedure indicated in Example 1, but without adding hexamethyl phosphoric acid triamide, the yield is only 90 g.

$$[\eta]=3.0\ \overline{M}_v\approx5\cdot10^5$$

The $[\eta]$-value is determined in water at 25° C.

EXAMPLE 3

2.12 g. of tris-acetylacetonate-zirconium-IV-chloride are dissolved in 50 ml. of toluene and reduced with 3.5 ml. of aluminum triethyl. The mixture is heated for 15 minutes at 100° C. and then cooled. 70 ml. of propylene oxides are added and heating takes place for 10 hours at 50° C. After removing the solvent, the yield is 63 g.=100% by weight.

$$[\eta]=3.54\ \overline{M}_v\approx7\cdot10^5$$

The $[\eta]$-value is determined in toluene at 25° C.

EXAMPLE 4

If the procedure of Example 3 is followed, but without adding hexamethyl phosphoric acid triamide, the yield is only 43 g.=75% by weight.

$$[\eta]=1.47\ \overline{M}_v\approx2.2\cdot10^5$$

The $[\eta]$-value is determined in toluene at 25° C.

EXAMPLES 5 TO 12

The procedure is as indicated in Example 3 and the catalyst indicated in the table are introduced.

| Example No. | Zirconium compound | HPT* | Yield, percent by weight | Benzene, 25° C. [$\eta$] | $\overline{M}_v$ |
|---|---|---|---|---|---|
| 5 | Zr(acac)$_2$Cl$_2$ | + | 80 | 4.30 | 9.5·10$^5$ |
| 6 | Zr(acac)$_2$Cl$_2$ | − | 80 | 1.54 | 2.4·10$^5$ |
| 7 | Zr(acac)$_4$ | + | 50 | 4.56 | 1.10$^6$ |
| 8 | Zr(acac)$_4$ | − | 100 | 3.31 | 6.5·10$^5$ |
| 9 | Zr(CH$_3$COO)$_4$ | + | 80 | 2.43 | 4.5·10$^5$ |
| 10 | Zr(CH$_3$COO)$_4$ | − | 30 | 1.53 | 2.4·10$^5$ |
| 11 | Zr(NO$_3$)$_4$ | + | 50 | 7.06 | 1.65·10$^6$ |
| 12 | Zr(NO$_3$)$_4$ | − | 50 | 4.62 | 9.5·10$^5$ |

*Hexamethyl phosphoric acid triamide.

In all examples( 5 mmol of zirconium compound in 50 ml. of toluene and 25 mmol of aluminum triethyl are introduced.

EXAMPLE 13

0.73 g. of tris-acetylacetonate-zirconium-IV-chloride are dissolved in 20 ml. of toluene, 0.5 ml. of hexamethyl phosphoric acid triamide are added and reduction is effected with 1.2 ml. of aluminum triethyl. Heating takes place for 15 minutes at 100° C., followed by cooling to room temperature and addition of 20 g. of cyclopentene oxide. After 12 hours at 50–70° C. the polymer is dissolved in toluene and precipitated in methanol. Yield 75% by weight.

[$\eta$]=4.76  $\overline{M}_v \approx 10^6$

The [$\eta$]-value is determined in toluene at 25° C.

EXAMPLE 14

If the procedure described in Example 13 is followed, but without adding hexamethyl phosphoric acid triamide, the yield is 60% by weight.

[$\eta$]=0.51  $\overline{M}_v \approx 7 \cdot 10^4$

The [$\eta$]-value is determined in toluene at 25° C.

EXAMPLE 15

5.3 g. of tris-acetylacetonate-zirconium-IV-chloride are dissolved in 500 ml. of toluene. 2.25 ml. of hexamethyl phosphoric acid triamide are added and reduction is effected with 8.75 ml. of aluminum triethyl. Stirring and heating take place for 10 minutes at 100° C., followed by cooling to room temperature and dropwise addition of 232 of epichlorohydrin. After 10 hours at 50° C. 1.500 ml. of dimethyl formamide are added and the polymer is precipitated in water. Yield 230 g. [$\eta$]=3.7 (determined in dimethyl formamide at 25° C.).

EXAMPLE 16

If the procedure of Example 15 is followed, but without adding hexamethyl phosphoric acid tri-amide, the yield is 180 g. [$\eta$]=1 (determined in dimethyl formamide at 25° C.).

EXAMPLE 17

4.97 g. of tris-acetylacetonate-zirconium-IV-chloride are dissolved in 500 ml. of toluene. 3.6 ml. of hexamethyl phosphoric acid triamide are added and reduction is effected with 6.8 ml. of aluminum triethyl. Heating takes place for 15 minutes at 100° C., followed by cooling to room-temperature and addition of 342 g. of epibromohydrine. After stirring 10 hours at 50° C. 500 ml. of dimethyl formamide are added and the polymer is precipitated in much water. Yield 221 g. [$\eta$]=3.9 determined in o-dichlorobenzene at 25° C.

EXAMPLE 18

If the procedure of Example 17 is followed, but without adding hexamethyl phosphoric acid triamide the yield is about 180 g. [$\eta$]=1.6 determined in o-dichlorobenzene at 25° C.

We claim:
1. A process for polymerizing a member selected from the group consisting of ethylene oxide, propylene oxide, epichlorohydrin, epibromohydrin and cyclopentene oxide which comprises polymerizing said selected member at a temperature of from −30 to 150° C. in the presence of a catalytic amount of a catalyst obtained by mixing tris-acetyl-acetonate-zirconium-IV-chloride with hexamethyl phosphoric acid triamide in a molar ratio between 20:1 and 1:50 and reducing said mixture with aluminum triethyl.

2. The process of claim 1 wherein said ratio is between 5:1 and 1:10.

References Cited
UNITED STATES PATENTS 3,408,313  10/1968  Foll _____ 260—2
3,450,647  6/1969  Gunther et al. _____ 260—2

WILLIAM H. SHORT, Primary Examiner

E. A. NIELSEN, Assistant Examiner

U.S. Cl. X.R.

252—431 N, 431 P; 260—47 EP, 88.3 A, 615